July 14, 1942.    C. F. O'BRIEN    2,289,853
CAMERA
Filed April 18, 1941
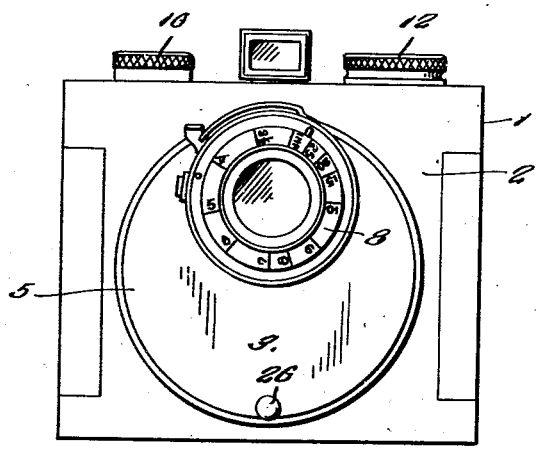
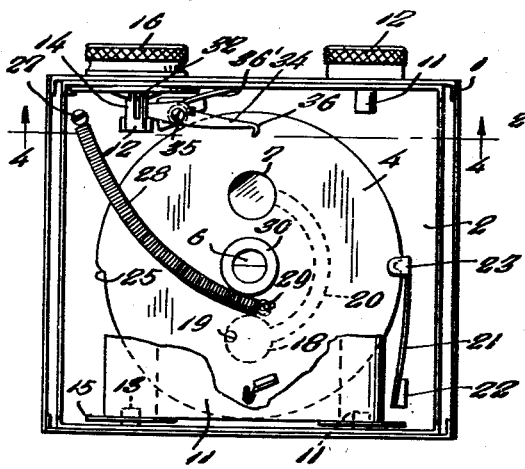
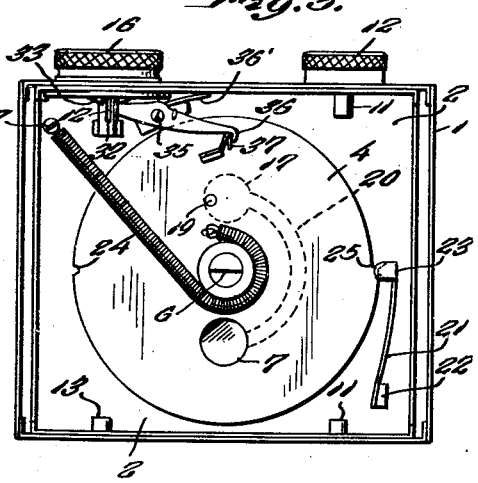
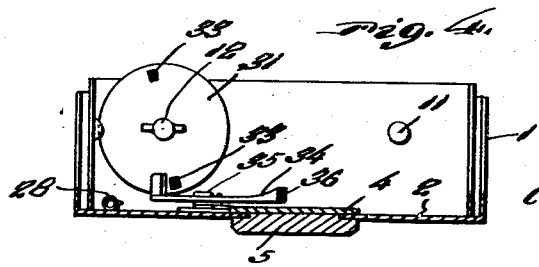
Inventor
Charles F. O'Brien
By Clarence A. O'Brien
Attorney Patented July 14, 1942

2,289,853

UNITED STATES PATENT OFFICE 2,289,853

CAMERA

Charles F. O'Brien, Hollis, N. Y.

Application April 18, 1941, Serial No. 389,241

1 Claim. (Cl. 95—31)

My invention relates to improvements in pocket cameras of the type forming the subject matter of my U. S. Letters Patent No. 2,204,819, dated June 18, 1940, and to which attention is invited.

By way of premise, the camera of my patent, supra, is characterized by a shutter carrying turn-table arranged for rotation through a complete revolution to revolve the shutter into diametrically opposite primary and secondary settings to take pictures alternately upon opposite sides of the longitudinal center of a film. Rotation of the turn-table from secondary back to primary position is accomplished manually.

The principal object of my invention is to provide inexpensive, simply constructed means for automatically rotating the turn-table from secondary back to primary setting for the shutter quickly and positively, thereby speeding up operation of the camera and obviating unnecessary manual operations in connection with its use.

Another object is to provide means for the above purpose operative under a safety control preventing return to primary setting until a new stretch of film is fed to replace the exposed section thereof.

To the accomplishment of the above, and subordinate objects presently appearing, a preferred embodiment of my invention has been illustrated in the accompanying drawing, set forth in detail in the succeeding description, and defined in the claim appended hereto.

In said drawing—

Figure 1 is a view in front elevation of a camera embodying my improvements.

Figure 2 is a view in rear elevation illustrating the position of the parts in the primary setting of the shutter.

Figure 3 is a similar view illustrating the position of the parts on the secondary setting of the shutter, and Figure 4 is a view in transverse section taken on the line 4—4 of Figure 2.

Reference being had to the drawing by numerals, the camera with which my invention is concerned embodies a rectangular, open back, front casing section 1 designed to be closed by a suitable back cover section, not shown, said section 1 embodying a front wall 2. The front wall 2 comprises a circular turn-table, designated as a unit 3, which includes a pair of inner and outer discs 4, 5 secured together concentrically and rotatably mounted on the front wall 2 by a suitable stud 6 disposed in the center of said wall. A pair of axially aligned apertures, one of which is shown at 7, is provided in said discs 4, 5 in radially offset relation to the stud 6 and with which a shutter assembly 8 correspondingly arranged on the opposite side registers. At one side of the section 1 is the usual pair of studs 9 in the top and bottom of the section 1 for detachably securing a roll of film 11 in the section in the usual manner, the top stud being manipulative by the knob 12. At the opposite side of the section 1 is the usual fixed stud 13 and the pull-out rewind stud 14 for the rewind reel 15 and which is manipulative by the nut 16. A pair of upper and lower apertures 17, 18 is provided in the front wall 2 in the vertical center thereof and upon opposite sides of the transverse center with which the apertures 7 and hence the shutter 8 register in the primary and secondary settings of the shutter.

According to the instant invention, in the primary setting of the turn-table 3, and the shutter 8, the latter registers with the uppermost apertures 17 and in the secondary with the lower one 18. The turn-table 3 is oscillated through a half revolution to revolve the shutter into said settings, respectively. A suitable stud 19 on the turn-table 3 playing in the slot 20 in the front wall 2 establishes the settings of the shutter, 8. A friction brake is provided for retarding oscillation of the turn-table 3 and which has the form of a leaf spring 21 fixed at one end, as at 22, to the front wall 2 and having a brake shoe 23 on its other end bearing against the edge of the inner disc 4, said disc having a suitable edge stop notch 24 for seating the shoe in one setting of the shutter 8 and an edge cam stop shoulder 25 diametrically opposite the notch 24 for coaction with the shoe in the other setting of the shutter 8.

A stud 26 on the disc 5 provides for manually rotating the turn-table 3 to revolve the shutter from primary to secondary setting. The following means are provided for automatically returning the shutter 3 to reestablish the primary setting of the shutter 8.

Fixed, as at 27, to the front wall 2 adjacent an upper corner of the section 1 is a coil spring 28 having its other end fixed, as at 29, to the inner disc 4 in proper location to be wound around a hub 30 on the disc 4 when the turn-table is rotated to revolve the shutter from primary to secondary setting. Thus the turn-table 3 is tensioned for rotation by the spring 28 back to primary setting of the shutter 8.

The following means are provided for controlling rotation of the turn-table 3. A disc 31 is splined on the stud 14, as represented at 32, and provided on one face with a pair of diametrically opposite cam lugs 33 adapted under each half rotation of the stud 14, in rewinding the reel 15, to engage and wipe past one end of a latch dog 34 pivoted intermediate its ends, as at 35, to the wall 2 to be rocked by said cams against the tension of a suitably arranged spring 36'. A hooked end 36 is provided on the latch dog 34 in the path of movement of a catch 37 on the inner disc 4, said catch 37 under rotation of the turn-table 5 to locate the shutter into its secondary setting, coacting with the end 36 to cam the latch dog 34 upwardly and said end snapping over the catch 37 to hold the turn-table against rotation by the spring 28. Obviously when the rewind stud 14 is rotated to feed an unexposed section of the film 11 into proper position, the latch dog 34 will be rocked to disengage the hooked end 36 from the catch 37 whereupon the spring 28 will return the turn-table 3 into position to reestablish the primary setting of the shutter 8.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the subjoined claim.

What I claim is:

In a camera, a shutter carrying turn-table rotatable in opposite directions to revolve the shutter into primary and secondary settings, respectively, film rewinding means including a rotary rewind key, a spiral spring tensioned by rotation of the turn-table in one direction for reaction to rotate the turn-table in the opposite direction, releasable detent devices for blocking rotation of the turn-table in said opposite direction released by operation of said key, and a leaf spring friction brake engaging one edge of the turn-table and retarding rotation of the turn-table.

CHARLES F. O'BRIEN.